April 4, 1961

K. R. TINSLEY 2,977,704

ICE FISHING TIP-UP

Filed May 23, 1960

INVENTOR.
KELVIN R. TINSLEY

BY Colman, Nard & Krass

ATTORNEYS

United States Patent Office 2,977,704
Patented Apr. 4, 1961

2,977,704
ICE FISHING TIP-UP
Kelvin R. Tinsley, 20421 Fenton, Detroit, Mich.
Filed May 23, 1960, Ser. No. 31,179
5 Claims. (Cl. 43—17)

This invention relates to an ice fishing tip-up and more particularly to a tip-up having a tubular support provided with a water seal therein whereby freezing of the flag releasing mechanism is prevented.

The invention involves a tubular support for a flagstaff mounting a flag, an actuating rod releasing the flag, a bearing seal for the rod at the lower portion of the tubular support, and a reel engageable with the rod. The bearing seal prevents water from collecting in the tube about the rod to an extent where it will freeze and prevent the rod from releasing the flag. This problem is a prime difficulty with tip-ups, particularly where the actuating rods are mounted exteriorly of their supporting members, or where viscous lubricants are used as seals. In the former case, the rod being exposed in the water and closely adjacent the support is frozen tight to the support in areas above the water line. In the second instance, the rod being closely confined within a housing is surrounded by lubricant of greater or lesser viscosity that solidifies and packs hard about the rod to restrain, restrict and interfere with its operation of releasing the flag.

The instant invention has for an object the solution of the problem of rod freeze-up by using a tubular support for the rod, placing a bearing seal in the lower portion of the support whereby water is prevented from entering the support thereabove to freeze the rod in place. Another object of the invention is provision of a line guide, for the fishing line on the reel, formed out of the tubular support. A further object is the provision of a crank for the reel whereby it can be used to reel in a fish caught on the line, as in a conventional rod and reel.

These and additional objects of the invention and features of construction will become more readily apparent from the description given below, in which the terms employed are used for purposes of description and not of limitation.

Reference is here made to the drawing annexed hereto, forming an integral part of this specification, and in which.

Figure 1:
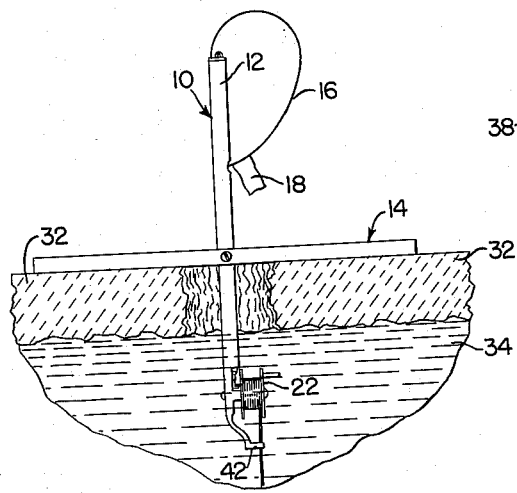
Fig. 1 is an elevational view of the inventive tip-up arranged for use in ice fishing.
Figure 2:
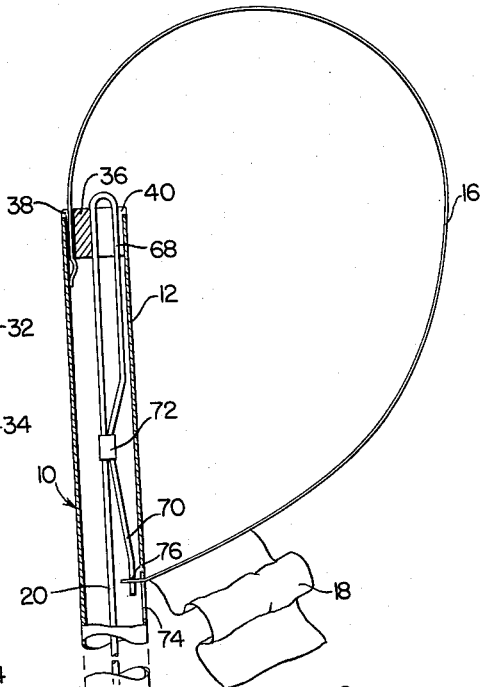
Fig. 2 is an enlarged elevational view partially in section of the tip-up shown in Fig. 1.

As shown in the several views of the drawings, the tip-up 10 comprises a tubular support 12, a folding cross-member 14, a flagstaff 16 mounting a flag 18, a rod 20, a reel 22, and a rod bearing seal 24.

The cross-member 14 consists of two parallel bars 26, 26 secured together in spaced relationship at each end by brackets 28, 28 and pivoted on the bolt 30 passed through the tubular support 12. When the cross-member is arranged substantially at right angles to the support 12, it rests upon the ice 32 (Fig. 1) across an opening therethrough, the support being vertical and having its lower portion in the water 34.

The tubular support 12 is provided with a plug cap 36 having a slot 38 therein to pass the flagstaff 16 through it upwardly for use or downwardly for storage in the tube. Another slot 40 is provided to pass the upper end of the rod 20 for release or engagement of the free end of the flagstaff. The support 12 is provided at its lower end with an offset line guide 42 notched out of the tube so that the line guide is disposed below reel 22 rotatably mounted on a pivot pin 44 secured in the tube at the portion 46. The support is also notched at 48 to provide access of the reel lug 50 for releasable engagement with the rod end 52. Seated in the tubular support 12 and closely adjacent the upper end of the notch 48 is the bearing seal 24.

The seal is a cylindrical element of a diameter or dimension to provide a press fit in the tubular support. A bore 54 leads into a counter bore 56 containing a packing or felt pad 58 impregnated with a light lubricant. The counterbore tapers downwardly in the seal so that the felt pad is forced under pressure toward the rod 20, closely encompassing it to prevent ingress of water from below the seal.

The rod 20 mounts a spring 60, a collar 62 fixedly attached to the rod above the spring and a washer 64 below the spring and bearing upon the packing or felt pad 58, which is always under compression. Rod 20 as it extends upwardly in the tubular support 12 is offset at 66 to bypass the pivot bolt 30, and extends to the top of the support 12 where it is formed with a reverse bend 68 and an offset arm 70 below a clip 72 holding the reverse bend to the rod. The arm 70 etxends downwardly into the area of a tube notch 74 through which the free end of the flagstaff can be introduced for releasable engagement by the arm 70. The flagstaff free end is provided with an opening 76 therethrough to receive the end of arm 70.

Reel 22 is provided with a pincrank 78 for turning the reel to retrieve a fish at the end of line 80.

In operation, the cross-member 14 is pivoted into a plane normal to the tubular support 12 and is disposed upon the top of the ice, the lower reel end of support 12 being placed in the water. Flagstaff 16 made of spring or flexible-resilient steel is raised until its bent end is adjacent slot 38 in the cap 36, and the free end is then bent around to the opening 74. Reel lug 50 is placed above and in engagement with the rod end 52 restraining it from release upwardly. The free end of the flagstaff is then engaged with the rod arm 70 which is passed into the opening 76 at the free end of the flagstaff. Line 80 which has previously been payed out is provided with a suitable fish hook at its end. When a fish strikes the hook and draws the line out, the reel 22 rotates, disengaging the lug 50 from rod end 52. Under the expansion action of the spring 60, the rod 20 jumps upwardly drawing the rod arm 70 out of the flagstaff opening 76, and the flagstaff 16 snaps up waving signal flag 18.

Figure 3:
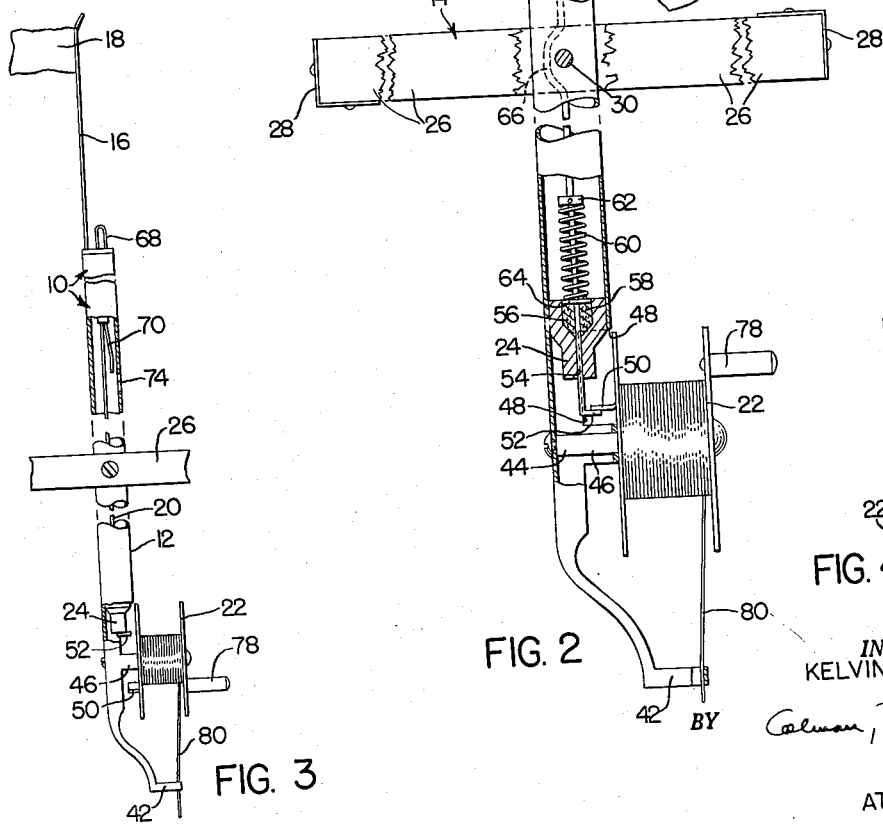
Fig. 3 is an elevational view of the tip-up when the flag has been released from its restricted position as shown in Figs. 1 and 2.
Figure 4:
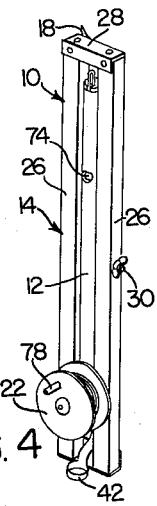
Fig. 4 is a perspective view of the tip-up when folded for storage or transportation.

In the expanded position, Fig. 3, spring 60 still maintains a substantial compression on the packing or felt pad 58 so that the rod 20 is closely encased at the seal 24, preventing water from passing upwardly into the tube 12.

When the fish is hooked, it can be played or handled by reel 22 as would be done with a conventional rod and reel by virtue of the crank 78, which is not provided on tip-up reels presently available.

The tubular support 12 is preferably made of aluminum or steel tubing and the cross-member arms 26, 26 of wood. The device when folded is compact and easy to carry without protruding wires, hooks, staples or other restrictive elements; it can be easily and quickly reset, rebaited and placed in use.

Having described the invention in its simplest terms, it is to be understood that the features of construction may be changed and varied in greater or lesser degree without departing from the essence of the invention defined in the appended claims.

I claim:

1. In an ice fishing tip-up, a tubular member adapted to be vertically positioned in an opening in the ice, a cross-member pivotally mounted on said tubular member substantially medially thereof and adapted to rest upon said ice and to support said tubular member in said opening, a flagstaff mounting a signal flag at its upper end and slidingly secured in said tubular member at the upper end thereof and adapted to be raised to its extended height on said tubular member, a fishing reel mounted on said tubular member exteriorly thereof, said tubular member being notched at spaced intervals adjacent its lower end to provide a support for said reel, said reel having a detent projecting inwardly therefrom within the compass of said tubular notched areas so that said reel is free to rotate free of interference by said tubular member, a signal flag releasing rod disposed slidingly and substantially axially in said tubular member having its lower terminal end bent normal to said axis and projecting outwardly in the compass of said tubular notched areas a distance sufficient to engage said reel detent, spring means mounted on said rod to raise said rod upwardly when disengaged from said reel detent upon rotation of said reel, and a bearing seal in said tubular member adjacent the upper end of said notched areas above said rod lower end and sealing said tubular member thereabove from ingress of water, said bearing seal having a counterbore in the upper end thereof and packing in said counterbore closely surrounding said rod, said spring means secured on said rod constantly compressively bearing on said packing to maintain a water seal about said rod.

2. In an ice fishing tip-up, a tubular member adapted to be vertically positioned in an opening in the ice, a cross-member pivotally mounted on said tubular member substantially medially thereof and adapted to rest upon said ice and to support said tubular member in said opening, a flagstaff mounting a signal flag slidingly secured in said tubular member at the upper end thereof and adapted to be raised on said tubular member, a fishing reel mounted on said tubular member exteriorly thereof, said tubular member being notched adjacent its lower end, said reel being supported on said tubular member for rotation within the compass of said notched area, said reel having a detent projecting therefrom within the compass of said notched area so that said reel rotates free of interference by said tubular member, a signal flag releasing rod disposed slidingly and substantially axially in said tubular member and having its lower terminal end bent substantially normal to said axis and projecting outwardly within the compass of said notched area a distance sufficient to come into releasable engagement with said reel detent, spring means mounted on said rod to raise said rod upwardly upon disengagement from said reel detent when said reel rotates, and a bearing seal in said tubular member adjacent the upper end of said notched area above said rod lower end and sealing said tubular member thereabove against the ingress of water and having a bore therethrough to slidingly pass said rod, said bearing seal having a counterbore in the upper end thereof and packing in said counterbore filling the same and closely surrounding said rod, said spring means constantly and compressively bearing on said packing to provide and maintain a water-tight seal about said rod.

3. The structure defined in claim 2, and in which said tubular member terminates at its lower end in a line guide for said reel.

4. The structure defined in claim 2, and in which said bearing seal is mounted in said tubular member with a tight press fit providing a water-tight seal about said bearing seal.

5. The structure defined in claim 2, and in which said cross-member is pivotable into alignment with said tubular member to form a compact portable structure.

References Cited in the file of this patent

UNITED STATES PATENTS

| | | |
|---|---|---|
| 2,114,529 | Goodhue | Apr. 19, 1938 |
| 2,122,841 | Laurila | July 5, 1938 |
| 2,693,046 | Langevin | Nov. 2, 1954 |